United States Patent
Shim et al.

(10) Patent No.: US 11,428,855 B2
(45) Date of Patent: *Aug. 30, 2022

(54) POLARIZING PLATE HAVING ENGRAVED OPTICAL PATTERNS AND LIQUID CRYSTAL DISPLAY INCLUDING THE SAME

(71) Applicant: SAMSUNG SDI CO., LTD., Yongin-si (KR)

(72) Inventors: Dae Seob Shim, Suwon-si (KR); Young Oh, Suwon-si (KR); Dong Ho Wee, Suwon-si (KR); Jeong Ho Lee, Suwon-si (KR); Yong Un Jung, Suwon-si (KR); Jang Hyun Cho, Suwon-si (KR); Young Hyun Ju, Suwon-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/667,317

(22) Filed: Feb. 8, 2022

(65) Prior Publication Data

US 2022/0163705 A1 May 26, 2022

Related U.S. Application Data

(63) Continuation of application No. 15/864,602, filed on Jan. 8, 2018, now Pat. No. 11,249,228.

(30) Foreign Application Priority Data

Jan. 9, 2017 (KR) .................. 10-2017-0003062

(51) Int. Cl.
*G02B 5/02* (2006.01)
*G02F 1/1335* (2006.01)
*G02F 1/13357* (2006.01)

(52) U.S. Cl.
CPC ......... *G02B 5/0263* (2013.01); *G02B 5/0215* (2013.01); *G02F 1/133504* (2013.01); *G02F 1/133528* (2013.01); *G02F 1/133606* (2013.01)

(58) Field of Classification Search
CPC .... G02B 5/021; G02B 5/0215; G02B 5/0231; G02B 5/0263; G02B 5/0278;
(Continued)

(56) References Cited

U.S. PATENT DOCUMENTS

2004/0114070 A1   6/2004   Huang
2013/0265506 A1   10/2013  Nishimura et al.
(Continued)

FOREIGN PATENT DOCUMENTS

CN   103885106 A   6/2014
CN   105793743 A   7/2016
(Continued)

OTHER PUBLICATIONS

China Office Action from corresponding Chinese Patent Application No. 201810020940.5, Chinese Office action dated Mar. 2, 2021 (8 pgs.).

(Continued)

*Primary Examiner* — Ryan S Dunning
(74) *Attorney, Agent, or Firm* — Lewis Roca Rothgerber Christie LLP

(57) ABSTRACT

A polarizing plate and a liquid crystal display including the same are provided. A polarizing plate includes a polarizing film and a contrast-improving optical film sequentially stacked in the stated order. The contrast-improving optical film includes a contrast-improving layer including a first resin layer and a second resin layer facing the first resin layer. The second resin layer includes a patterned portion having optical patterns and a flat section between the optical patterns. The second resin layer satisfies Equation 1, and the (Continued)

polarizing plate has a contrast ratio gain of about 1.00 or more, as represented by Equation 2.

16 Claims, 2 Drawing Sheets

(58) Field of Classification Search
CPC .......... G02B 5/0294; G02B 5/30–3091; G02B 27/28–288; G02F 1/133504; G02F 1/133606; G02F 1/133528; G02F 1/133533; G02F 1/133536; G02F 2001/133531; G02F 2001/133538; G02F 2001/133541; G02F 2001/133543; G02F 2001/133545; G02F 2001/133548; G02F 2001/13355; G02F 1/13362
USPC ........................................ 359/483.01–494.01
See application file for complete search history.

(56) References Cited

U.S. PATENT DOCUMENTS

2016/0315287 A1   10/2016   Heo
2018/0188589 A1    7/2018   Han et al.

FOREIGN PATENT DOCUMENTS

| CN | 105929476 A | 9/2016 |
| JP | 2006-251659 A | 9/2006 |
| KR | 10-2016-0105667 A | 9/2016 |
| KR | 10-1659241 B1 | 9/2016 |
| TW | 201643483 A | 12/2016 |
| WO | WO 2016/175580 A1 | 11/2016 |

OTHER PUBLICATIONS

China Office Action from corresponding Chinese Patent Application No. 201810020940.5, Chinese Office action dated Jun. 23, 2020 (7 pgs.).

Korean Office action from corresponding Korean Application No. 10-2017-0003062, Office action dated Mar. 20, 2019 (6 pgs.).

POLARIZING PLATE HAVING ENGRAVED OPTICAL PATTERNS AND LIQUID CRYSTAL DISPLAY INCLUDING THE SAME

CROSS-REFERENCE TO RELATED APPLICATION

This application is a continuation of U.S. application Ser. No. 15/864,602, filed on Jan. 8, 2018, which claims priority to and the benefit of Korean Patent Application No. 10-2017-0003062, filed on Jan. 9, 2017 in the Korean Intellectual Property Office, the entire disclosures of both of which are incorporated herein by reference.

BACKGROUND

1. Field

Aspects of embodiments of the present invention relate to a polarizing plate and a liquid crystal display including the same.

2. Description of the Related Art

A liquid crystal display is operated to emit light through a liquid crystal panel after receiving the light from a backlight unit. Since light from the backlight unit is perpendicularly incident upon a screen of a liquid crystal display, the screen of the liquid crystal display inevitably has a lower contrast ratio (CR) when viewed in a lateral direction than when viewed in a front direction. Therefore, optical films for improving side contrast ratio are being developed.

Generally, a contrast-improving optical film improves a contrast ratio using optical patterns. For example, the contrast ratio can be improved by an optical film in which flat sections and optical patterns are alternately formed. The optical pattern includes an inclined surface and can improve the contrast ratio by refracting and diffusing light incident upon the inclined surface, and the flat section can diffuse light and maintain brightness by emitting light reaching the flat section. However, although side contrast ratio can be improved through such an optical pattern, front contrast ratio is generally reduced. Therefore, there is a need for a polarizing plate capable of improving side contrast ratio while minimizing or reducing reduction in front contrast ratio.

One example of the related art is disclosed in Japanese Patent Laid-Open Publication No. 2006-251659.

SUMMARY

According to an aspect of embodiments of the present invention, a polarizing plate is capable of improving side contrast ratio while minimizing or reducing reduction in front contrast ratio.

According to another aspect of embodiments of the present invention, a polarizing plate is capable of improving side viewing angle.

According to an aspect of embodiments of the present invention, a polarizing plate for liquid crystal displays (LCDs) and a liquid crystal display including the same are provided.

In accordance with an aspect of one or more embodiments of the present invention, a polarizing plate includes a polarizing film and a contrast-improving optical film sequentially stacked, wherein the contrast-improving optical film includes a contrast-improving layer, the contrast-improving layer includes a first resin layer and a second resin layer facing the first resin layer, the second resin layer includes a patterned portion having optical patterns and a flat section between the optical patterns, the second resin layer satisfying Equation 1:

$$0 \leq (\text{Maximum thickness of second resin layer} - \text{Maximum height of optical pattern})/(\text{Maximum height of optical pattern}) \leq 1, \text{ and} \quad <\text{Equation 1}>$$

the polarizing plate having a contrast ratio gain of about 1.00 or more, as represented by Equation 2:

$$\text{Contrast ratio gain} = \text{Side relative contrast ratio} \times \text{Front relative contrast ratio}, \quad <\text{Equation 2}>$$

where each of the side relative contrast ratio and the front relative contrast ratio is described in the following detailed description.

In accordance with another aspect of one or more embodiments of the present invention, a liquid crystal display includes the polarizing plate according to an embodiment of the present invention.

According to an aspect of embodiments of the present invention, a polarizing plate capable of improving side contrast ratio while minimizing or reducing reduction in front contrast ratio is provided.

According to another aspect of embodiments of the present invention, a polarizing plate capable of improving side viewing angle is provided.

DETAILED DESCRIPTION

Figure 1:
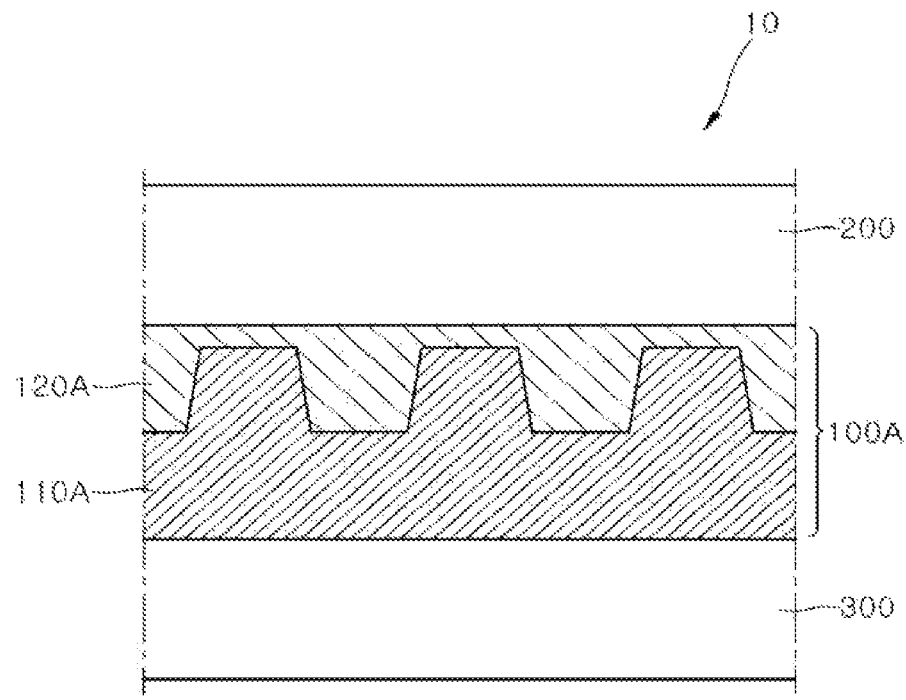
FIG. 1 is a cross-sectional view of a polarizing plate according to an embodiment of the present invention.

Some embodiments of the present invention will be described in further detail with reference to the accompanying drawings to provide a thorough understanding of the invention to those skilled in the art. It should be understood that the present invention may be embodied in different ways and is not limited to the following embodiments. In the drawings, portions irrelevant to the description may be omitted for clarity. Like components will be denoted by like reference numerals throughout the specification.

Herein, spatially relative terms, such as "upper" and "lower," are defined with reference to the accompanying drawings. Thus, it is to be understood that the term "upper surface" can be used interchangeably with the term "lower surface," and when an element such as a layer or a film is referred to as being placed "on" another element, it can be directly placed on the other element, or one or more intervening elements may be present. On the other hand, when an element is referred to as being placed "directly on" another element, there are no intervening elements therebetween.

Herein, the terms "horizontal direction" and "vertical direction" mean a longitudinal direction and a transverse direction of a rectangular screen of a liquid crystal display, respectively. As used herein, "front side" and "side" with reference to the horizontal direction, the side is indicated by (0°, 60°) in the spherical coordinate system represented by (φ, θ) in which a front side is indicated by (0°, 0°), a left end point is indicated by (180°, 90°), and a right end point is indicated by (0°, 90°).

Herein, the term "top part" refers to the highest portion in an engraved optical pattern.

Herein, "aspect ratio" refers to a ratio of maximum height of an optical pattern to maximum width thereof (maximum height/maximum width).

Herein, "pitch" refers to a distance between adjacent optical patterns, that is, the sum of the maximum width of one optical pattern and the width of one flat section.

Herein, "in-plane retardation (Re)" is a value measured at a wavelength of 550 nm and represented by Equation A:

$$Re=(nx-ny)\times d,$$

where nx and ny are the indices of refraction in the slow and fast axes of a corresponding protective layer or base layer at a wavelength of 550 nm, respectively, and d is the thickness (unit: nm) of the protective layer or base layer.

Herein, the term "(meth)acryl" refers to acryl and/or methacryl.

Figure 2:
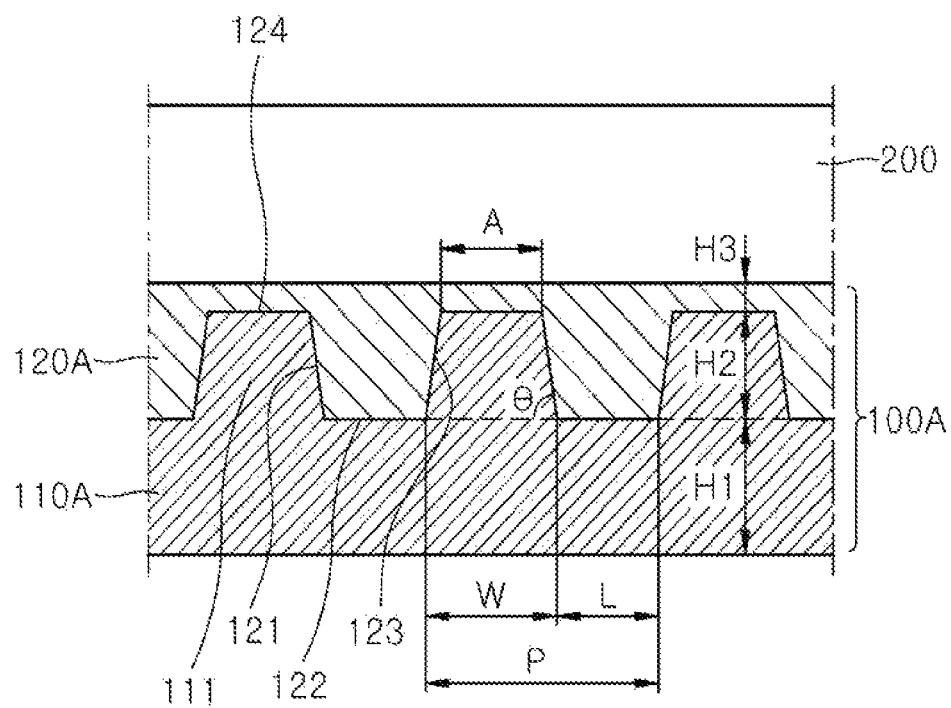
FIG. 2 is a cross-sectional view of a contrast-improving optical film of the polarizing plate of FIG. 1, according to an embodiment of the present invention.

Herein, a polarizing plate according to an embodiment of the present invention will be described with reference to FIG. 1 and FIG. 2. FIG. 1 is a cross-sectional view of a polarizing plate according to an embodiment of the present invention; and FIG. 2 is a cross-sectional view of a contrast-improving optical film of the polarizing plate of FIG. 1, according to an embodiment of the present invention.

Referring to FIG. 1, a polarizing plate 10 according to an embodiment of the present invention may include a polarizing film 300 and a contrast-improving optical film, which includes a contrast-improving layer 100A and a protective layer 200. The contrast-improving optical film is formed on a light exit surface of the polarizing film 300. The contrast-improving optical film includes the contrast-improving layer 100A satisfying Equation 1 set forth below.

The contrast-improving optical film will be described in further detail with reference to FIG. 2.

Contrast Improving Layer

The contrast-improving layer 100A includes a first resin layer 110A and a second resin layer 120A facing the first resin layer 110A.

Second Resin Layer

The second resin layer 120A is formed on the first resin layer 110A, specifically, on a light exit surface of the first resin layer 110A. The second resin layer 120A can increase light diffusion by diffusing light incident from the light exit surface of the first resin layer 110A.

The second resin layer 120A includes a patterned portion having one or more optical patterns 121 and a flat section 122 between adjacent optical patterns 121. An optical pattern 121 includes at least one inclined surface 123 inclined with respect to the flat section 122. FIG. 1 shows one example in which the optical patterns 121 are engraved patterns.

The second resin layer 120A satisfies Equation 1:

0≤(Maximum thickness of second resin layer−Maximum height of optical pattern)/(Maximum height of optical pattern)≤1.   <Equation 1>

The second resin layer 120A satisfies Equation 1, such that when polarized light passing through the first resin layer 110A passes through the second resin layer 120A, the side contrast ratio can be improved by refraction of the polarized light on the optical pattern 121, and front brightness in a black mode can be reduced by reducing a degree of scattering of light in the second resin layer 120A, thereby improving a contrast ratio gain represented by Equation 2 set forth below. The contrast ratio gain represented by Equation 2 allows determination of an effect of improvement in visibility in both front and lateral directions by reducing a decrement of the front contrast ratio and increasing an increment of the side contrast ratio, as compared with a polarizing plate free from the contrast-improving layer.

In particular, according to embodiments of the present invention, the polarizing plate includes a first surface at a top part of the optical pattern. The expression (Maximum thickness of second resin layer−Maximum height of optical pattern) is included in Equation 1 and thus allows the degree of scattering of the light, which passes through the first resin layer and is also present between the top part of the optical pattern and the protective layer, to be controlled in a certain range, thereby improving the contrast ratio gain while improving or maintaining the side contrast ratio. In an embodiment, a value of the expression (Maximum thickness of second resin layer−Maximum height of optical pattern)/ (Maximum height of optical pattern) is from about 0 to about 0.75, and, in an embodiment, is about 0.

In this way, the polarizing plate may have a contrast ratio (CR) gain of about 1.00 or more, as represented by Equation 2. Within this range, the polarizing plate 10 can reduce the decrement of the front contrast ratio while improving side visibility.

Contrast ratio gain=Side relative contrast ratio×Front relative contrast ratio   <Equation 2≤ where the front relative contrast ratio is a ratio of a front contrast ratio of the polarizing plate including the contrast improving layer to a front contrast ratio of a corresponding polarizing plate not including the contrast improving layer, and the side relative contrast ratio is a ratio of a side contrast ratio of the polarizing plate including the contrast improving layer to a side contrast ratio of a corresponding polarizing plate not including the contrast improving layer.

The contrast ratio gain represented by Equation 2 indicates an effect of improvement in visibility by increasing the increment of the side contrast ratio, and when the contrast ratio gain represented by Equation 2 is about 1.00 or more, the increment of the side CR can be greater than the decrement of the front CR. In an embodiment, the polarizing plate 10 has a contrast ratio gain of about 1.00 or more, and, in an embodiment, about 1.05 to about 1.5.

A value of the expression (Maximum thickness (H2+H3) of second resin layer 120A−Maximum height H2 of optical pattern 121), that is, H3, may be from 0 μm to 5 μm. Within this range, the contrast-improving optical film can reduce the decrement of the front contrast ratio while increasing the increment of the side contrast ratio. In an embodiment, the value of the expression (Maximum thickness (H2+H3) of second resin layer 120A−Maximum height H2 of optical pattern 121) is 0 μm, and, in this case, a first surface 124 of the optical pattern 121 contacts the protective layer 200.

FIG. 1 and FIG. 2 show a structure in which the optical patterns 121 have the same height. However, the optical patterns 121 may have different heights or at least one of adjacent optical patterns 121 may have a different height. In this case, the maximum height H2 of the optical patterns 121 refers to a height calculated by SEM measurement.

The patterned portion may satisfy Equation 3 set forth below, and the optical pattern 121 may have a base angle θ of about 75° to about 90°. The base angle θ refers to an angle formed between the inclined surface 123 of the optical pattern 121 and a line along a maximum width W of the optical pattern 121. Within this range, the contrast-improving optical film can improve relative brightness in the front direction, improve both the front contrast ratio and the side contrast ratio, reduce a difference between the front contrast ratio and the side contrast ratio, and improve the contrast ratio at the same side viewing angle and the same front viewing angle. In an embodiment, the optical pattern 121 has a base angle θ of about 80° to about 90°, and, in an embodiment, about 90°, and, in an embodiment, has a value of P/W of about 1.2 to about 8, and, in an embodiment, about 1.2 to about 5.

$$1 < P/W \leq 10, \quad \text{<Equation 3>}$$

where P is a pitch (unit: μm) of the patterned portion, and W is the maximum width (unit: μm) of the optical pattern 121.

Although FIG. 2 shows a structure in which both base angles of the optical pattern are equal to each other, the optical pattern may have different base angles so long as the base angles are from about 75° to about 90° as described above.

The optical pattern 121 may be an optical pattern including the first surface 124 formed at a top part thereof and at least one inclined surface 123 connected to the first surface 124. Although FIG. 2 shows a trapezoidal optical pattern in which two adjacent inclined surfaces 123 are connected to each other via the first surface 124, the present invention is not limited thereto.

The first surface 124 is formed at the top part of the optical pattern and can improve viewing angle and brightness by further diffusing light reaching the second resin layer 120A in an optical display. Therefore, the contrast-improving optical film can improve light diffusion, thereby minimizing or reducing brightness loss.

In an embodiment, the first surface 124 may be a flat surface to facilitate a process of forming the contrast-improving optical film. Alternatively, the first surface 124 may have fine roughness or a curved surface. In the structure in which the first surface 124 is a curved surface, the optical pattern may be realized by a lenticular lens pattern.

In an embodiment, the first surface 124 may be parallel to at least one of the flat section 122, a lowermost surface of the first resin layer 110A, and an uppermost surface of the second resin layer 120A. FIG. 2 shows the structure in which the first surface 124 of the optical pattern 121, the flat section 122, the lowermost surface of the first resin layer 110A, and the uppermost surface of the second resin layer 120A are parallel to each other.

In an embodiment, the first surface 124 may have a width A of about 0.5 μm to about 30 μm, and, in an embodiment, about 2 μm to about 20 μm. Within this range, the first surface 124 can be used for the polarizing plate.

FIG. 2 shows an engraved pattern which includes one flat surface formed at a top part thereof and flat inclined surfaces, and has a trapezoidal cross-sectional shape (for example, a truncated prism pattern having a truncated triangular cross-sectional shape, that is, a truncated prism shape or a cut-prism shape). Alternatively, the optical pattern may be an engraved pattern in which the first surface is formed at the top part thereof and the inclined surfaces are curved surfaces (for example, a contrast improving layer having a truncated lenticular (cut-lenticular) lens pattern or a truncated microlens (cut-microlens) pattern). In an embodiment, the optical pattern has a square or rectangular cross-sectional shape.

In an embodiment, the optical pattern 121 may have an aspect ratio (H2/W) of about 0.3 to about 3.0, and, in an embodiment, about 0.4 to about 2.5, and, in an embodiment, about 0.4 to about 1.5. Within this range, an optical display can exhibit improved contrast ratio and viewing angle in a lateral direction.

In an embodiment, the optical pattern 121 may have a maximum height H2 of about 15 μm or less, and, in an embodiment, about 10 μm or less, and, in an embodiment, about 5 μm to about 7 μm. Within this range, an optical display can exhibit improvement in contrast ratio, viewing angle, and brightness without suffering from the Moiré phenomenon and the like.

In an embodiment, the optical pattern 121 may have a maximum width W of about 80 μm or less, and, in an embodiment, about 50 μm or less, and, in an embodiment, about 5 μm to about 20 μm or about 5 μm to about 10 μm. Within this range, an optical display can exhibit improvement in contrast ratio, viewing angle, and brightness without suffering from the Moiré phenomenon and the like. Although FIG. 2 shows a structure in which the optical patterns 121 of the patterned portion have a same maximum width, the engraved optical patterns 121 may have different maximum widths, or at least one of adjacent engraved optical patterns 121 may have a different maximum width.

Upon receiving light from the first resin layer 110A, the flat section 122 emits the light to the second resin layer 120A, thereby improving front brightness.

A ratio (W/L) of the maximum width W of the optical pattern 121 to a width L of the flat section 122 may be about 9 or less, and, in an embodiment, may be about 0.1 to about 3, and, in an embodiment, from about 0.15 to about 2. Within this range, the contrast-improving optical film can improve relative brightness in the front direction, reduce a difference between the front contrast ratio and the side contrast ratio, and improve the contrast ratio at the same side viewing angle and the same front viewing angle. In addition, the contrast-improving optical film can prevent or substantially prevent the Moiré phenomenon. In an embodiment, the flat section 122 may have a width L of about 1 μm to about 300 μm, and, in an embodiment, about 3 μm to about 50 μm. Within this range, the contrast-improving optical film can improve front brightness.

The maximum width W of one optical pattern 121 and the flat section 122 directly adjacent thereto form one pitch P.

The pitch P may be from about 5 μm to about 500 μm, and, in an embodiment, from about 10 μm to about 50 μm. Within this range, the optical pattern can improve brightness and contrast ratio without causing the Moiré phenomenon. Although FIG. 2 shows a structure in which adjacent pitches P of the patterned portion are the same, it should be understood that the pitches P may be different from one another or at least one of adjacent pitches P may be different from the other pitches P.

The second resin layer 120A may have a maximum thickness (H2+H3) of about 20 μm or less, for example, about 5 μm to about 15 μm. Within this range, the contrast-improving optical film can minimize or reduce decrement in side CR.

FIG. 2 shows a structure in which the optical pattern is an engraved pattern. Alternatively, the optical pattern may be an embossed pattern.

Although not clearly shown in FIG. 2, FIG. 2 shows a structure in which the optical patterns extend in a stripe shape. Alternatively, the optical patterns may be formed in a dot shape. The term "dot" means that combinations of a filling pattern and an optical pattern are dispersed.

In an embodiment, the second resin layer 120A has a higher index of refraction than the first resin layer 110A. Therefore, when light enters a light incident surface of the first resin layer 110A, the contrast-improving layer 100A diffuses and emits the light, thereby improving relative brightness in the front direction, improving both the front contrast ratio and the side contrast ratio, minimizing or reducing decrement of the front contrast ratio while increasing the side contrast ratio, reducing a difference between the front contrast ratio and the side contrast ratio, and improving the contrast ratio at the same side viewing angle and the same front viewing angle.

An absolute value of a difference in index of refraction between the second resin layer 120A and the first resin layer 110A (index of refraction of second resin layer 120A—index of refraction of first resin layer 110A) may be from about 0.05 to about 0.20, and, in an embodiment, from about 0.06 to about 0.15. Within this range, the contrast-improving optical film can provide large effects of diffusing condensed light while improving the contrast ratio. In particular, when the difference in index of refraction is from about 0.06 to about 0.12, the contrast-improving optical film can have an excellent effect of diffusing polarized light in an optical display and thus improve brightness even at the same viewing angle.

The second resin layer 120A may have an index of refraction of about 1.50 or more, and, in an embodiment, about 1.50 to about 1.70, and, in an embodiment, about 1.50 to about 1.62. Within this range, the contrast-improving optical film can have an excellent effect on light diffusion. The second resin layer 120A may include a UV curable or thermally curable composition including at least one of (meth)acrylic, polycarbonate, silicone, and epoxy resins, without being limited thereto.

First Resin Layer

The first resin layer 110A may refract and emit light upon receiving light through a lower surface thereof from an optical display in various directions depending upon light incident positions, thereby diffusing the light. The first resin layer 110A at least partially contacts the second resin layer 120A.

The first resin layer 110A may include a filling pattern 111 which at least partially fills the optical pattern 121. When an element is referred to as "at least partially filling" the optical pattern, the element may completely fill the optical pattern, or partially fill the optical pattern. When the filling pattern 111 partially fills the optical pattern 121, the remaining space of the optical pattern 121 may be filled with air or a resin having a certain index of refraction. In an embodiment, the resin may have an index of refraction which is less than or equal to that of the first resin layer 110A and is greater than or equal to that of the second resin layer 120A.

The first resin layer 110A may be a layer including the filling pattern 111. The first resin layer 110A may have an index of refraction of less than about 1.52, and, in an embodiment, about 1.35 or more and less than about 1.50. Within this range, the contrast-improving optical film can have a large effect of light diffusion, can be easily formed, and can have large effects of diffusing polarized light and improving contrast ratio. The first resin layer 110A may be formed of a UV curable or thermally curable composition including a transparent resin. The transparent resin may include at least one of (meth)acrylic, polycarbonate, silicone, and epoxy resins, without being limited thereto. The transparent resin may have a light transmittance of about 90% or more after curing.

The first resin layer 110A may have a minimum thickness H1 of about 1 μm or more, for example, about 5 μm to about 20 μm. Within this range, the first resin layer 110A can be used for the contrast-improving optical film. In an embodiment, the first resin layer 110A is self-adhesive and thus may be directly attached to the polarizing film 300, such that the first resin layer 110A allows the contrast-improving optical film to be well attached to the polarizing film 300.

FIG. 1 shows the structure in which the second resin layer 120A has a higher index of refraction than the first resin layer 110A. However, the second resin layer 120A may have a lower index of refraction than the first resin layer 110A. In an embodiment, the second resin layer 120A may have an index of refraction of less than 1.52, and, in an embodiment, about 1.35 or more and less than about 1.50, and the first resin layer 110A may have an index of refraction of about 1.50 or more, and, in an embodiment, about 1.50 to about 1.70, and, in an embodiment, about 1.50 to about 1.60. Within this range, the contrast-improving optical film can have an excellent effect of light diffusion. Within this range, the contrast-improving optical film can improve side contrast ratio.

The contrast improving layer 100A may have a thickness of about 10 μm to about 100 μm, and, in an embodiment, about 20 μm to about 60 μm, and, in an embodiment, about 20 μm to about 45 μm. Within this range, the contrast improving layer 100A can be used for an optical display.

The contrast improving layer 100A may be stacked on the protective layer 200.

In an embodiment, the second resin layer 120A may be a non-adhesive layer having no adhesion. In this case, one or more adhesive layers, bonding layers, or adhesive bonding layers may be formed between the second resin layer 120A and the protective layer 200. In another embodiment, the second resin layer 120A may be self-adhesive. In this case, the second resin layer 120A may be directly formed on or contacting the protective layer 200. In an embodiment, when the second resin layer 120A is self-adhesive, the second resin layer 120A may be formed of at least one of acrylic, epoxy, and urethane resins.

Protective Layer

The protective layer 200 may be formed on the contrast improving layer 100A, support the contrast-improving layer 100A, and emit light having passed through the contrast-improving layer 100A.

The protective layer 200 may include at least one of a protective film and a protective coating layer, which are optically transparent.

When the protective layer is of a protective film type, the protective layer may include a protective film formed of an optically transparent resin. In an embodiment, the protective film may be formed through melting and extrusion of the resin. The resin may be further subjected to stretching, as needed. The optically transparent resin may include at least one selected from cellulose esters including triacetyl cellulose, cyclic polyolefin including amorphous cyclic olefin polymer (COP), polycarbonate, polyester including polyethylene terephthalate (PET), polyethersulfone, polysulfone, polyimide, polyimide, non-cyclic polyolefin, polyacrylate including poly(methyl methacrylate), polyvinyl alcohol, polyvinyl chloride, and polyvinylidene chloride resins.

The protective film may be a non-stretched film, a retardation film which is obtained by stretching the resin by a certain method and has a certain range of retardation, or an isotropic optical film. In an embodiment, the protective film may have an Re of about 8,000 nm or more, and, in an embodiment, about 10,000 nm or more, and, in an embodiment, greater than about 10,000 nm, and, in an embodiment, about 10,100 nm to about 15,000 nm. Within this range, the protective film can prevent or substantially prevent generation of rainbow spots while further diffusing light diffused by the contrast improving layer. In another embodiment, the protective film may be an optically isotropic film having an Re of about 60 nm or less, and, in an embodiment, about 0 nm to about 60 nm, and, in an embodiment, about 40 nm to about 60 nm. Within this range, the protective film can provide good image quality through compensation for viewing angle. Herein, the term "isotropic optical film" means a film having substantially the same nx, ny, and nz, and the expression "substantially the same" includes not only the case in which nx, ny, and nz are completely the same, but also the case in which there is an acceptable margin of error between nx, ny, and nz.

Although not shown in FIG. 2, the protective film may include a base film and a primer layer formed on at least one surface of the base film. A ratio of an index of refraction of the primer layer to an index of refraction of the base film (index of refraction of primer layer/index of refraction of base film) may be about 1.0 or less, and, in an embodiment, may be from about 0.6 to about 1.0, and, in an embodiment, from about 0.69 to about 0.95, and, in an embodiment, from about 0.7 to about 0.9, and, in an embodiment, from about 0.72 to about 0.88. Within this range, a first base layer can have improved transmittance. The base film may have an index of refraction of about 1.3 to about 1.7, and, in an embodiment, about 1.4 to about 1.6. Within this range, the base film can be used as the first base layer, allow easy control of the index of refraction with respect to the primer layer, and improve transmittance of the first base layer. The base film may include a film formed of the resin as set forth above. The primer layer may have an index of refraction of about 1.0 to about 1.6, and, in an embodiment, about 1.1 to about 1.6, and, in an embodiment, about 1.1 to about 1.5. Within this range, the primer layer has an appropriate index of refraction, as compared with the base film, thereby improving transmittance of the base layer. The primer layer may have a thickness of about 1 nm to about 200 nm, and, in an embodiment, about 60 nm to about 200 nm. Within this range, the primer layer can be used for an optical film, have an appropriate index of refraction, as compared with the base film, and thus improve transmittance of the base layer without embrittlement. In an embodiment, the primer layer may be a non-urethane primer layer free from a urethane group. In an embodiment, the primer layer may be formed of a primer layer composition including a resin or monomer such as polyester, acryl, or the like. The primer layer may have the index of refraction as set forth above by controlling a mixing ratio (for example, a molar ratio) between these monomers. The primer layer composition may further include at least one of additives, such as UV absorbers, antistatic agents, defoamers, surfactants, and the like.

When the protective layer is of a protective coating layer type, the protective layer can provide excellent properties in terms of adhesion to the second resin layer, transparency, mechanical strength, thermal stability, moisture blocking, and durability. In an embodiment, the protective coating layer may be formed of an actinic radiation-curable resin composition including an actinic radiation-curable compound and a polymerization initiator.

The actinic radiation-curable compound may include at least one of a cationic polymerizable curable compound, a radical polymerizable curable compound, a urethane resin, and a silicone resin. The cationic polymerizable curable compound may be an epoxy compound having at least one epoxy group, or an oxetane compound having at least one oxetane ring per molecule. The radical polymerizable curable compound may be a (meth)acrylic compound having at least one (meth)acryloyloxy group per molecule.

The epoxy compound may include at least one of a hydrogenated epoxy compound, a chain-type aliphatic epoxy compound, a cyclic aliphatic epoxy compound, and an aromatic epoxy compound.

The radical polymerizable curable compound may realize a protective coating layer having excellent hardness and mechanical strength and high durability. Examples of the radical polymerizable curable compound may include a (meth)acrylate monomer having at least one (meth)acryloyloxy group per molecule and a (meth)acrylate oligomer obtained by reacting at least two functional group-containing compounds and having at least two (meth)acryloyloxy groups per molecule. Examples of the (meth)acrylate monomer may include a monofunctional (meth)acrylate monomer having one (meth)acryloyloxy group per molecule, a bifunctional (meth)acrylate monomer having two (meth)acryloyloxy groups per molecule, and a polyfunctional (meth)acrylate monomer having three or more (meth)acryloyloxy groups per molecule. Examples of the (meth)acrylate oligomer may include a urethane (meth)acrylate oligomer, a polyester (meth)acrylate oligomer, and an epoxy (meth)acrylate oligomer.

The polymerization initiator can cure the actinic radiation-curable compound. The polymerization initiator may include at least one of a photocationic initiator and a photosensitizer. The photocationic initiator may include any typical photocationic initiator known in the art. In an embodiment, the photocationic initiator may include an onium salt including a cation and an anion. In an embodiment, the cation may include diaryl iodonium such as diphenyliodonium, 4-methoxydiphenyliodonium, bis(4-methylphenyl)iodonium, bis(4-tert-butylphenyl)iodonium, bis(dodecylphenyl)iodonium, and (4-methylphenyl)[(4-(2-methylpropyl)phenyl)iodonium; triarylsulfoniums such as triphenylsulfonium and diphenyl-4-thiophenoxyphenylsulfonium; and bis[4-(diphenylsulfonio)phenyl]sulfide. In an embodiment, the anion may include hexafluorophosphate ($PF_6^-$), tetrafluoroborate ($BF_4^-$), hexafluoroantimonate ($SbF_6^-$), hexafluoroarsenate ($AsF_6^-$), and hexachloroantimonate ($SbCl_6^-$). The photosensitizer may be any typical photosensitizer known in the art. In an embodiment, the photosensitizer may include at least one selected from thioxanthone, phosphorus, triazine, acetophenone, benzophenone, benzoin, and oxime photosensitizers.

The actinic radiation-curable resin composition may further include general additives such as silicone leveling agents, UV absorbers, antistatic agents, and the like.

In an embodiment, the protective layer 200 may have a thickness of about 5 μm to about 200 μm, and, in an embodiment, about 30 μm to about 120 μm. In addition, the protective layer 200 of a protective film type may have a thickness of about 35 μm to about 100 μm and the protective layer 200 of a protective coating layer type may have a thickness of about 5 μm to about 50 μm. Within this range, the protective layer 200 can be used in a light emitting display.

A surface treatment layer, such as any of primer, hard coating, anti-fingerprint, anti-reflective, anti-glare, low-reflective, and ultralow-reflective layers, for example, may be further formed on at least one surface of the protective layer 200. The primer layer may improve adhesion between a polarizer and the protective layer 200. The hard coating, anti-fingerprint, anti-reflective layer, or the like may provide additional functions to the protective layer 200, the polarizing film, or the like.

In an embodiment, the contrast-improving optical film may have a thickness of about 30 μm to about 120 μm, for example, about 40 μm to about 110 μm. Within this range, the contrast-improving optical film can secure processability and exhibit improved surface hardness.

The contrast-improving optical film may be formed by a general method known to those skilled in the art. For example, a resin for the second resin layer may be coated onto the protective layer, subjected to application of the optical pattern and the flat section, and then cured, thereby forming the second resin layer. Next, a resin for the first resin layer may be coated onto the second resin layer while filling the optical pattern, and then cured, thereby forming the contrast-improving optical film. However, it should be understood that the present invention is not limited thereto.

Polarizing Film

The polarizing film 300 can polarize and transmit light received from a liquid crystal panel. The polarizing film 300 is formed on a light exit surface of the contrast-improving layer 100A.

The polarizing film 300 may include a polarizer. In an embodiment, the polarizer may include a polyvinyl alcohol polarizer obtained by uniaxially stretching a polyvinyl alcohol film, or a polyene-based polarizer obtained by dehydrating a polyvinyl alcohol film. In an embodiment, the polarizer may have a thickness of about 5 μm to about 40 μm. Within this range, the polarizing film 300 can be used in an optical display.

The polarizing film 300 may include the polarizer and a protective layer formed on at least one surface of the polarizer. The protective layer protects the polarizer, thereby improving reliability and mechanical strength of the polarizing plate. Descriptions of the protective layer may be the same or substantially the same as the descriptions provided as to the protective layer included in the contrast-improving optical film. In an embodiment, the protective layer is a polyester protective film (for example, a polyethylene terephthalate film) having an Re of about 8,000 nm or more, and, in an embodiment, about 10,000 nm or more, and, in an embodiment, greater than about 10,000 nm, and, in an embodiment, about 10,100 nm to about 15,000 nm.

The contrast-improving layer 100A may be formed on the polarizing film 300.

In an embodiment, the first resin layer may be a non-adhesive layer having no adhesion. In this case, one or more adhesive layers, bonding layers, or adhesive bonding layers may be formed between the first resin layer 110A and the polarizing film 300. In another embodiment, the first resin layer may be self-adhesive. In this case, the first resin layer 110A may be directly formed on or contacting the polarizing film 300. In an embodiment, when the first resin layer is self-adhesive, the first resin layer may be formed of at least one of acrylic, epoxy, and urethane resins.

Although not shown in FIG. 1, an adhesive layer may be formed on a lower surface of the polarizing film 300 to attach the polarizing plate to a liquid crystal panel.

Although not shown in FIG. 1, one or more protective layers, anti-reflective films, and the like may be further stacked on the light exit surface of the protective layer 200 via adhesive layers.

Herein, a polarizing plate according to another embodiment of the present invention will be described with reference to FIG. 3.

Figure 3:
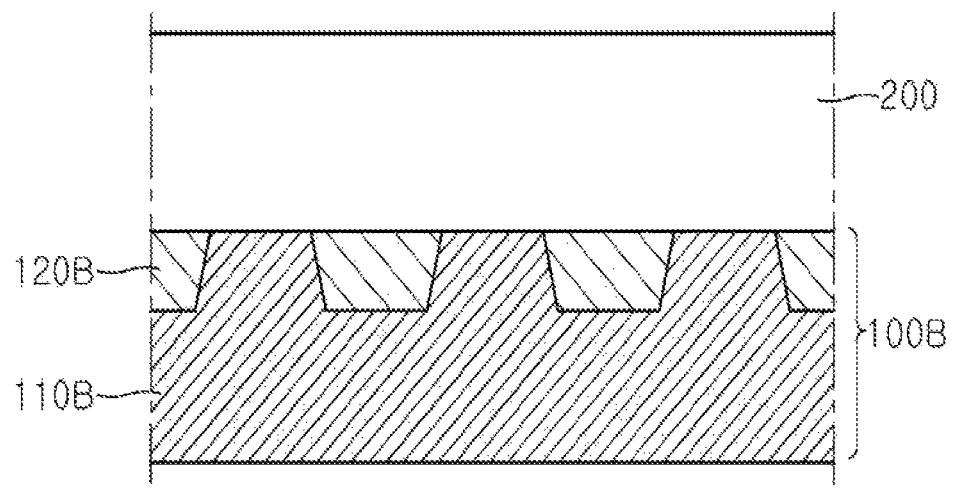
FIG. 3 is a cross-sectional view of a contrast-improving optical film of a polarizing plate, according to another embodiment of the present invention.

Referring to FIG. 3, the polarizing plate includes a contrast improving layer 100B in which a value of (Maximum thickness of second resin layer–Maximum height of optical pattern)/(Maximum height of optical pattern) is about 0. In this way, the polarizing plate can maximize or increase front CR. The contrast improving layer 100B includes a first resin layer 110B and a second resin layer 120B facing the first resin layer 110B.

According to embodiments of the present invention, a liquid crystal display may include the polarizing plate according to the present invention. In an embodiment, the liquid crystal display may include the polarizing plate at the viewer side with respect to a liquid crystal panel. Herein, the term "polarizing plate at the viewer side" refers to a polarizing plate placed on the side of a screen of the liquid crystal panel, that is, on a side of the liquid crystal panel opposite a light source.

In an embodiment, the liquid crystal display may include a backlight unit, a first polarizing plate, the liquid crystal panel, and a second polarizing plate, which are stacked in the stated order, wherein the second polarizing plate may include the polarizing plate according to the present invention. The liquid crystal panel may employ a vertical alignment (VA) mode, an IPS mode, a patterned vertical alignment (PVA) mode, or a super-patterned vertical alignment (S-PVA) mode, without being limited thereto.

In another embodiment, the liquid crystal display may include the polarizing plate at the light source side. Herein, the term "polarizing plate at the light source side" refers to polarizing plates disposed at the light source side with respect to the liquid crystal panel.

In a further embodiment, both the polarizing plate at the viewer side and the polarizing plate at the light source side with respect to the liquid crystal panel may include the polarizing plate according to the present invention.

Next, the present invention will be described in more detail with reference to some examples. However, it should be noted that these examples are provided for illustration only and are not to be construed in any way as limiting the present invention.

Example 1

A UV curable resin (SSC-5760, SHIN-A T&C Co., Ltd.) was coated onto one surface of a polyethylene terephthalate (PET) film (thickness: 80 μm, Re=8,000 nm at wavelength of 550 nm, Toyobo Co., Ltd.) for protective layers. Then, a film having a patterned portion, which includes optical patterns having the same base angles at both sides thereof and a flat section formed between the optical patterns, was applied to the coating layer to form engraved patterns and a flat section, followed by curing, thereby forming a second resin layer (index of refraction: 1.60) including a patterned portion, in which engraved patterns (having a square cross-sectional shape as shown in FIG. 1) have the same base angles at both sides thereof as listed in Table 1, and a flat section.

A UV curable resin (SSC-4560, SHIN-A T&C Co., Ltd.) was coated onto the second resin layer while completely filling the engraved pattern, followed by curing the UV curable resin, thereby forming a contrast-improving optical film in which a first resin layer (index of refraction: 1.48) having a filling pattern completely filling the engraved pattern was formed. The first resin layer was self-adhesive.

A polarizer was prepared by stretching a polyvinyl alcohol film at 60° C. to 3 times an initial length thereof and adsorbing iodine to the stretched film, followed by stretching the film to 2.5 times the stretched length of the film in an aqueous solution of boric acid at 40° C.

A polarizing plate was prepared by bonding the first resin layer of the contrast-improving optical film to one surface of the polarizer.

Examples 2 and 3

Each of polarizing plates was prepared in the same manner as in Example 1 except that a patterned portion including optical patterns modified as listed in Table 1 and a flat section was formed.

Comparative Example 1

A polarizing plate was prepared in the same manner as in Example 1 except that a patterned portion including optical patterns modified as listed in Table 1 and a flat section was formed.

Reference Example 1

A polarizing plate was prepared in the same manner as in Example 1 except that a contrast-improving layer was not formed.

The contrast-improving optical film and the polarizing plate of each of the Examples and Comparative Example were evaluated as to properties listed in Table 1. Results are shown in Table 1.

Front brightness, relative brightness, front contrast ratio, and side contrast were evaluated using a module for liquid crystal displays manufactured in the following manner.

Preparative Example 1: Fabrication of First Polarizing Plate

A first polarizer was prepared by stretching a polyvinyl alcohol film to 3 times an initial length thereof at 60° C., and adsorbing iodine to the stretched film, followed by stretching the film to 2.5 times the stretched length of the film in an aqueous solution of boric acid at 40° C. As a base layer, a triacetyl cellulose film (thickness: 80 µm) was bonded to both surfaces of the first polarizer using a bonding agent (Z-200, Nippon Goshei Co., Ltd.) for polarizing plates, thereby fabricating a first polarizing plate.

Preparative Example 2: Fabrication of Module for Liquid Crystal Displays

The first polarizing plate of Preparative Example 1, a liquid crystal panel (PVA mode), and each of the polarizing plates prepared in the Examples and Comparative Examples were assembled in the stated order, thereby fabricating a module for liquid crystal displays. Each of the polarizing plates prepared in the Examples and Comparative Example was used as a viewer side polarizing plate, and an anti-reflection film was placed on the outermost position on the viewer side.

An LED light source, a light guide plate, and the module for liquid crystal displays were assembled, thereby fabricating a liquid crystal display (which had the same configuration as a Samsung LED TV (UN32H5500) except for using each of the modules for liquid crystal displays of the Examples and Comparative Example) including a one-side edge type LED light source.

Brightness was measured in each of a white mode and a black mode at each of coordinates (0°, 0°) and coordinates (0°, 60°) in the spherical coordinate system using EZCON-TRAST X88RC (EZXL-176R-F422A4, ELDIM Co., Ltd.). Front contrast ratio was calculated as a ratio of brightness in the white mode to brightness in the black mode at the coordinates (0°, 0°) in the spherical coordinate system. Side contrast ratio was calculated as a ratio of brightness in the white mode to brightness in the black mode at the coordinates (0°, 60°) in the spherical coordinate system. Front relative contrast ratio was calculated by the expression (Front contrast ratio of each of modules of Examples and Comparative Example/Front contrast ratio of module of Reference Example 1). Side relative contrast ratio was calculated by the expression (Side contrast ratio of each of modules of Examples and Comparative Example/Side contrast ratio of module of Reference Example 1).

An angular position at which brightness was measured as ½ of front brightness in the white mode was taken as a ½ viewing angle.

TABLE 1

| | | Example 1 | Example 2 | Example 3 | Comparative Example 1 | Reference Example 1 |
|---|---|---|---|---|---|---|
| Second resin layer | Shape | Cut-prism | Cut-prism | Cut-prism | Cut-prism | — |
| | H3 (µm) | 0 | 0 | 5 | 10 | — |
| | Maximum height of optical pattern (H2) (µm) | 7 | 5 | 7 | 7 | — |
| | Maximum width of optical pattern (W) (µm) | 7 | 7 | 7 | 7 | — |
| | Width of flat section (L) (µm) | 7 | 7 | 7 | 7 | — |
| | Pitch (P) (µm) | 14 | 14 | 14 | 14 | — |
| | Base angle (°) | 90 | 90 | 90 | 90 | — |
| | Value of expression in Equation 1 | 0 | 0 | 0.71 | 1.43 | — |
| Minimum thickness of first resin layer (H1) (µm) | | 15 | 15 | 15 | 15 | — |
| Relative brightness (%, white mode, (0°, 0°)) | | 96 | 95 | 96 | 96 | 100 |
| Relative brightness (%, black mode, (0°, 0°)) | | 119 | 121 | 127 | 141 | 100 |
| Front relative contrast ratio | | 0.81 | 0.79 | 0.76 | 0.68 | 1.00 |
| Side relative contrast ratio | | 1.40 | 1.40 | 1.32 | 1.30 | 1.00 |

TABLE 1-continued

|  | Example 1 | Example 2 | Example 3 | Comparative Example 1 | Reference Example 1 |
|---|---|---|---|---|---|
| Contrast ratio gain represented by Equation 2 | 1.13 | 1.11 | 1.00 | 0.88 | 1.00 |
| 1/2 viewing angle (°) | 74.8 | 73.8 | 73.5 | 76.7 | 67.4 |

As shown in Table 1, the polarizing plates of the Examples had good visibility both in front and lateral directions by reducing a decrement of the front contrast ratio while increasing an increment of the side contrast ratio, as compared with the polarizing plate not including the contrast-improving layer. In addition, the polarizing plates of the Examples increased the ½ viewing angle and thus could increase the side viewing angle.

On the other hand, the polarizing plate of Comparative Example 1, which did not satisfy Equation 1 despite the contrast-improving layer, had a larger decrement of the front contrast ratio and a smaller increment of the side contrast ratio than the polarizing plates according to the present invention, and thus had a contrast ratio gain of less than 1.00, as represented by Equation 2.

It is to be understood that various modifications, changes, alterations, and equivalent embodiments may be made by those skilled in the art without departing from the spirit and scope of the present invention.

What is claimed is:

1. A polarizing plate for a liquid crystal display and adapted to receive light from a liquid crystal panel of the liquid crystal display, the polarizing plate including a polarizing film and a contrast-improving optical film sequentially stacked,
wherein the contrast-improving optical film is on a light exit surface of the polarizing film from which the light from the liquid crystal panel leaves;
wherein the contrast-improving optical film includes a contrast-improving layer,
the contrast-improving layer including a first resin layer and a second resin layer facing the first resin layer,
the second resin layer including a patterned portion having engraved optical patterns and a flat section between the engraved optical patterns,
the second resin layer satisfying Equation 1:

0≤(maximum thickness of second resin layer−maximum height of engraved optical pattern)/(maximum height of engraved optical pattern)≤1,     <Equation 1> the polarizing plate having a contrast ratio gain of about 1.00 or more, as represented by Equation 2:

contrast ratio gain=side relative contrast ratio×front relative contrast ratio,     <Equation 2> where the front relative contrast ratio is a ratio of a front contrast ratio of the polarizing plate including the contrast-improving layer to a front contrast ratio of a corresponding polarizing plate not including the contrast-improving layer, and
the side relative contrast ratio is a ratio of a side contrast ratio of the polarizing plate including the contrast-improving layer to a side contrast ratio of a corresponding polarizing plate not including the contrast-improving layer,
wherein the first resin layer includes a filling pattern which at least partially fills the engraved optical pattern of the second resin layer.

2. The polarizing plate according to claim 1, wherein the optical patterns have a base angle (θ) of about 75° to about 90° and the patterned portion satisfies Equation 3:

1<P/W≤10,     <Equation 3> where P is a pitch (unit: μm) of the patterned portion, and W is a maximum width (unit: μm) of each of the optical patterns.

3. The polarizing plate according to claim 1, wherein the engraved optical patterns are trapezoidal optical patterns in which two adjacent inclined surfaces are connected to each other via a first surface.

4. The polarizing plate according to claim 1, wherein the engraved optical patterns have an aspect ratio (H2/W) of about 0.3 to about 3.0.

5. The polarizing plate according to claim 1, wherein a difference in index of refraction between the second resin layer and the first resin layer is about 0.05 to about 0.20.

6. The polarizing plate according to claim 1, wherein the second resin layer has a higher index of refraction than the first resin layer.

7. The polarizing plate according to claim 1, wherein a value of the expression (maximum thickness of second resin layer−maximum height of optical pattern) in Equation 1 is about 5 μm or less.

8. The polarizing plate according to claim 1, wherein the first resin layer has a minimum thickness of about 1 μm or more.

9. The polarizing plate according to claim 1, wherein the engraved optical patterns have a maximum height of about 15 μm or less.

10. The polarizing plate according to claim 1, wherein the second resin layer has a maximum thickness of about 20 μm or less.

11. The polarizing plate according to claim 1, wherein at least one of the first resin layer and the second resin layer is self-adhesive.

12. The polarizing plate according to claim 1, wherein the contrast-improving optical film further includes a protective layer.

13. The polarizing plate according to claim 12, wherein the protective layer includes at least one of a protective film and a protective coating layer.

14. The polarizing plate according to claim 1, wherein the polarizing plate further includes at least one of a protective layer and an anti-reflective film on a light exit surface of the contrast-improving optical film.

15. The polarizing plate according to claim 1, wherein a value of the expression (maximum thickness of second resin layer−maximum height of optical pattern) in Equation 1 is about 0 μm, and the engraved optical patterns have a base angle (θ) of about 90°.

16. A liquid crystal display including the polarizing plate according to claim 1.

* * * * *